United States Patent [19]

Hargrave et al.

[11] Patent Number: 4,602,362
[45] Date of Patent: Jul. 22, 1986

[54] INFORMATION TRANSPORT SYSTEM

[75] Inventors: Franklin Hargrave; Francisco A. Middleton, both of Newtown; Santanu Das, Shelton, all of Conn.

[73] Assignee: ITT Corporation, New York, N.Y.

[21] Appl. No.: 667,527

[22] Filed: Nov. 2, 1984

[51] Int. Cl.⁴ .................... H04Q 11/00; G08C 15/08; G08C 15/12
[52] U.S. Cl. .................. 370/54; 340/870.13; 370/58
[58] Field of Search .................. 370/58, 110.1, 89, 54; 340/870.12, 870.13

[56] References Cited

U.S. PATENT DOCUMENTS 3,629,846 12/1971 Thompson ........................... 370/54
4,256,926 3/1981 Pitroda et al. ....................... 370/58
4,322,843 3/1982 Beuscher et al. ..................... 370/58

FOREIGN PATENT DOCUMENTS 0005842 12/1979 European Pat. Off. ............. 370/54

Primary Examiner—Douglas W. Olms
Assistant Examiner—Frank M. Scutch, III
Attorney, Agent, or Firm—Peter C. Van Der Sluys; Robert A. Hays

[57] ABSTRACT

A system for transporting data between equipment connected to a subscriber telephone line and a provider of services connects with subscriber telephone lines at a central office of a telephone company. The system includes a set of first multiplexers which are coupled to individual ones of the subscriber lines at a point between the cross-switching of the central office and the subscriber premises. Output signals of the first multiplexers fan into a second multiplexer. Bidirectional communication is provided between each of the multiplexers and the subscriber equipment, and also between the second multiplexer and the service provider via a line scanner which generates command signals for the operation of the first and second multiplexers. The first multiplexers, the second multiplexer, the line scanner and a host computer of the service provider can be located at a distance from each other and may be coupled together by communication links which permit the bidirectional flow of data.

9 Claims, 11 Drawing Figures

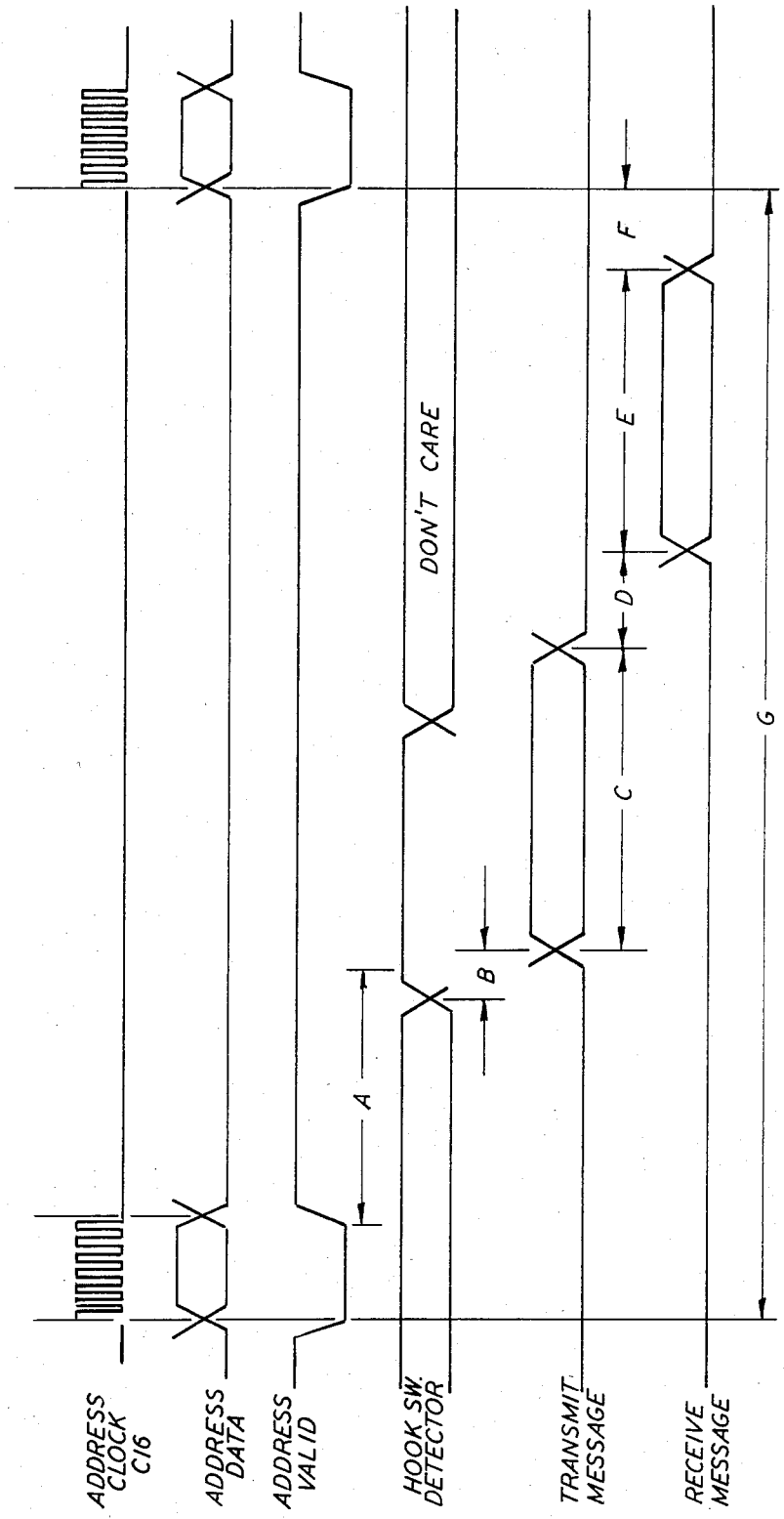

INFORMATION TRANSPORT SYSTEM

BACKGROUND OF THE INVENTION

This invention relates to an information transport system using existing telephone lines and, more particularly, to the interconnecting of a communication system to the telephone lines via multiplexing circuitry. The multiplexing circuitry bypasses telephone central-office switching equipment to permit customers of the system, such as gas, water and other utilities, to transmit data directly between the customer and numerous telephone subscribers.

The premises of telephone subscribers generally have sources of data which may be processed automatically by users of the data. For example, subscriber premises may have electric meters, gas meters, water meters and other devices having a metered output of usage such as pay television. The foregoing customers process the data provided by the meters for billing purposes. Of course, the customers must have some method of obtaining the data from the meters.

Currently, two methods of obtaining the data are available. One method, a representative of the customer visits the subscriber premises to read the meter. Separate representatives may be dispatched for the reading of gas and water meters. The second method is useful only in some locations where meters are provided with encoding equipment which converts the meter reading to electric signals which can be transmitted over the telephone lines. Then, the meters can be read by use of the telephone system whereby automatic dialing equipment dials the number of the meter which is to be read, and transmits command signals to activate the encoder to transmit the meter reading. The second method thus entails a two-way transmission of control and data signals via the telephone lines and the central-office switching equipment.

The foregoing methods of obtaining and transmitting data suffer disadvantages and introduce problems. The first method employing the manual reading and manual data transmission requires additional personnel to read the meters.

The second method, employing automatic reading and data transmission, is advantageous in that existing subscriber telephone lines are employed, and in that new lines do not have to be built. However, the second method may overload the central-office switching, particularly if employed during business hours when telephone usage is high. In addition, the second method experiences delays of the switching equipment in establishing a telephone circuit. Both methods however, are much slower than modern communication systems which transports many forms of data.

SUMMARY OF THE INVENTION

The foregoing problems are overcome and other advantages are provided by an information transport system which utilizes existing telephone subscriber lines, and which incorporates multiplexing equipment of the invention to bypass central-office switching equipment, thereby permitting the rapid bidirectional automatic transmission of data between numerous subscriber premises and customers (such as utility companies) of the system.

Connection of the multiplexing equipment to the telephone system is made at a main distribution frame at the central office. Access to a subscriber line is attained by removal of an arc (or lightning) suppressor from its connection to the subscriber line at a connection block, and insertion of a plug or adapter in the form of a tee connector between the arc suppressor and the subscriber line. Wires from the plug connect with the multiplexing equipment. The use of the plug permits connection of the multiplexing equipment without disturbance of existing wiring harnesses in the main distribution frame.

In accordance with a feature of the invention, wires from a set of adjacent plugs or adapters along a row of the connector block connect with an element of a first stage multiplexer. Each multiplexing element receives five subscriber lines which fan into a single line by operation of the element. A group of ten elements is contained within a single first stage multiplexer to process 100 subscriber lines on a connector block of the main distribution frame. The individual multiplexing elements are sufficiently small so as to be mounted along the edge of a connector block. A plurality of first stage multiplexers are connected by a second stage multiplexer to provide access to a larger number of subscribers. For example, ten first-stage multiplexers fanning into a second stage multiplexer provide access to 1000 subscribers. A line scanner couples the second-stage multiplexer to a data bus for communication with the customer.

In this manner, two-way communication is established between subscriber and customer. The line scanner is responsive to requests for data from a customer, which requests may be generated by a host computer for rapid sequential interrogation of subscriber equipment. The line scanner, in response to the data requests, generates control signals for operation of the multiplexing equipment for making connection with both the correct subscriber and the specific equipment (gas meter or water meter) on the subscriber's premises. The line scanner also verifies the integrity (as by parity checks) of data transmitted from subscriber to customer. The various portions of the multiplexing equipment are of modular construction which permits the system of the invention to be readily expanded to accommodate more subscribers.

BRIEF DESCRIPTION OF THE DRAWING

The foregoing aspects and other features of the invention are explained in the following description, taken in connection with the accompanying drawing wherein:

FIG. 11 is a timing diagram useful in explaining the operation of the system of FIG. 1.

DETAILED DESCRIPTION

Figure 1:
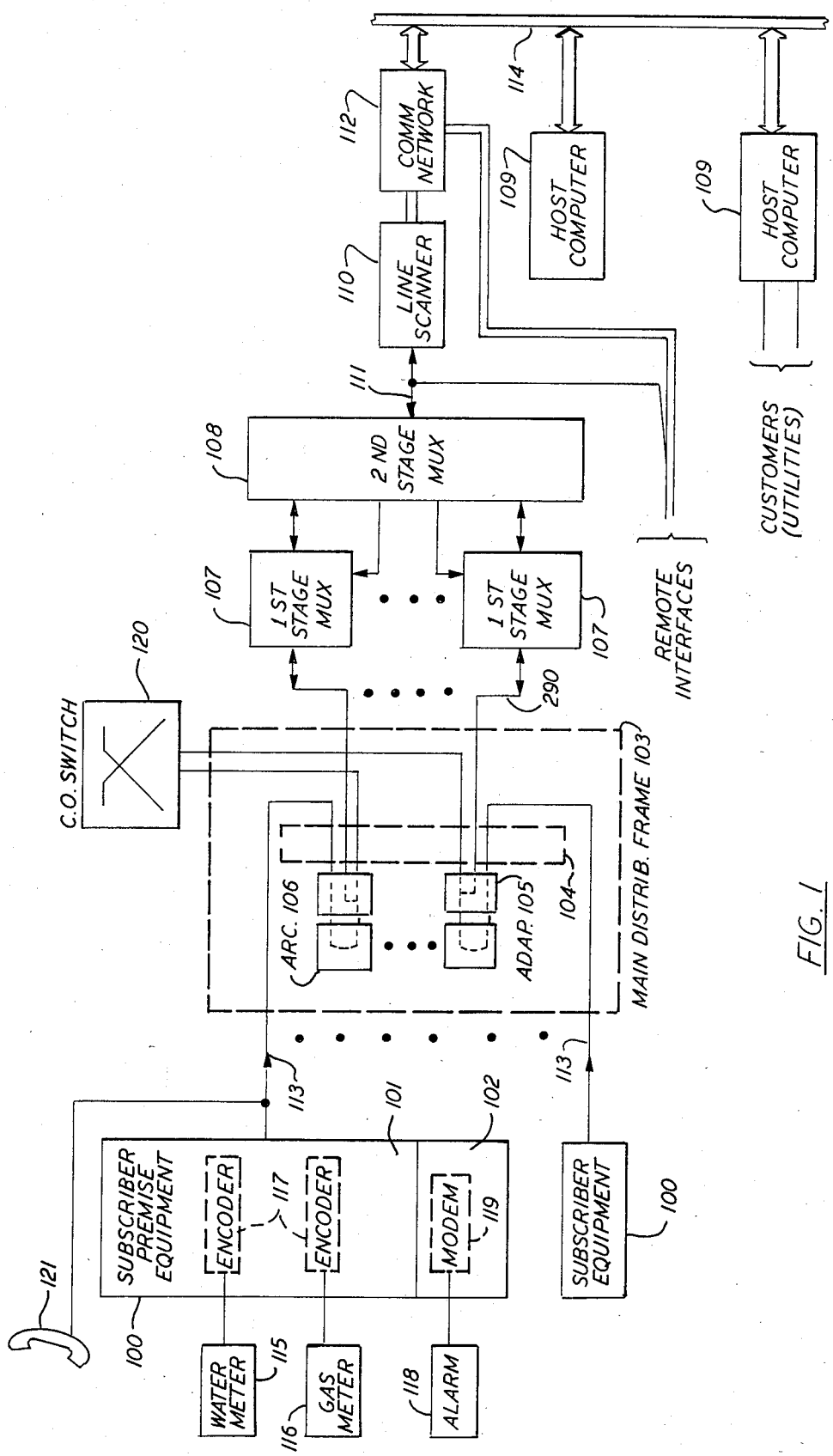
FIG. 1 is a simplified block diagram of the information transport system of the invention connecting at a telephone central office to subscriber lines.

FIG. 1 shows an overall view, in simplified diagrammatic form, of an information transport system incorporating the invention and connecting with subscriber telephone lines of a telephone system. At the subscriber premises of each subscriber there is located equipment 100 having a section 101 for passive action and a section 102 for active action as will be described subsequently. The equipment 100 is connected by telephone lines to a main distribution frame 103 located at a central office.

The main distribution frame 103 includes a connector block 104 having plugs or adapters 105 disposed thereon and supporting arc suppressors 106. Subscriber telephone lines from the equipment 100 pass by the adapters 105 and the arc suppressors 106 prior to connection with other portions of the telephone system. The adapters 105 are more fully disclosed in copending patent application having Ser. No. 595,108 now abandoned and U.S. Pat. No. 4,575,840. Both filed Mar. 3, 1984. A continuing application Ser. No. 779,291 filed Sept. 15, 1985 on the former and assigned to the assignee hereof. Briefly, the adapters 105 may be formed as individual plugs or the block of plugs disposed in a side-by-side array for engagement with terminals on the connector block 104 and for receiving pins from the arc suppressor 106. The arc suppressor 106 protects circuitry at the central office from lightning and other sources of surge voltage appearing on the subscriber telephone lines.

The system of the invention further comprises a set of first-stage multiplexers 107, a second-stage multiplexer 108 connecting with each of the first-stage multiplexers 107, host computers 109, and a line scanner 110. The scanner 110 connects with the second-stage multiplexer 108 by a line 111, and is coupled via a communication network 112 to the host computers 109 as well as to remote interfaces.

Subscriber telephone lines 113 connect between the equipments 100 and respective ones of the first-stage multiplexers 107 by means of the adapters 105. The adapters 105 are electrically structured in the form of tee connectors, with the connection to the multiplexers 107 being made on the protected side of the arc suppressors 106. A bus 114 connects the computers 109 with the communication network 112 by which network the computers 109 communicate with the scanner 110.

At the subscriber premises, two exemplary meters are shown, namely, a water meter 115 and a gas meter 116 which connect to encoders 117 within the equipment 100. The encoders 117 convert the meter readings of the meters 115 and 116 to digital signals which can be communicated via the telephone line 113. Each of the encoders 117 is activated by specific signals generated by the multiplexing equipment, including the multiplexers 107 and 108, under control of the scanner 110 whereby only one of the encoders 117 is activated at any one time, in accordance with whether the water meter 115 or the gas meter 116 is to be read. The section of the equipment 100 housing the encoders 117 is designated as the passive section 101 because data is transmitted with the meters 115 and 116 acting in a passive mode such that the data is transmitted only upon activation by a signal from the multiplexing equipment. Also shown in the FIG. 1, is an alarm 118 coupled by a modem 119 to the subscriber telephone line 113. The modem 119 is in a section of the equipment 100 referred to as the active section 102 because data is transmitted by the modem 119 when activated by the alarm 118. Such data is transmitted irrespectively of the command signals which may be generated by the multiplexing equipment and the control of the line scanner 110. The multiplexers are scanned rapidly through each of the telephone lines so as to sense the presence of an alarm, therby to transmit the alarm rapidly to a utility or service agency such as a fire department. A host computer 109 recognizes the presence of an alarm and transmits suitable warning signals to the appropriate service agency.

Also shown in FIG. 1, is a telephone 121 which is connected to the subscriber line 113 along with the equipment 100. The aforementioned connection of the equipment 100 and the multiplexing equipment 107-108 to the subscriber line 113 permitting normal use of the telephone 121. In the operation of the scanner 110, interrogation of the equipment 100 is delayed until such time as when the telephone 121 is not in use, therefore to avoid any interference with telephonic communication. Normal telephonic communication proceeds via the line 113 of the main distribution frame 103, and then to a central office switch which connects the telephone 121 with a desired party in the local or in a remote area. The operation of the central-office switch 120 is used in its normal fashion.

Figure 2:
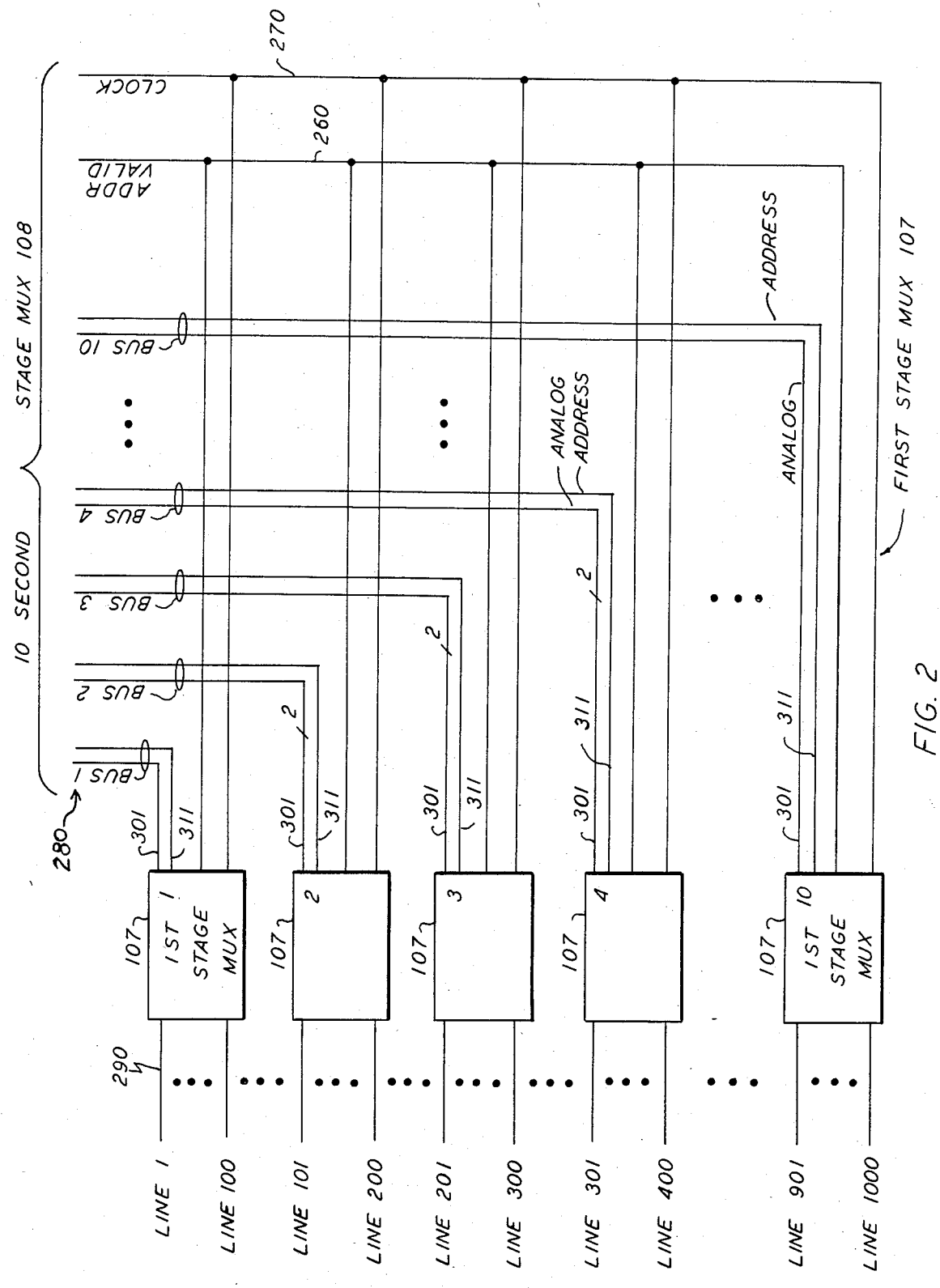
FIG. 2 is a block diagram showing a set of first-stage multiplexers connected to a second stage multiplexer of FIG. 1.

The system of the invention will now be described in greater detail with reference to the FIGS. 2–11. Briefly, the interconnections of the first-stage multiplexers 107 with the second-stage multiplexer 108 and the scanner 110 are set forth in FIGS. 2–4. Each of the first stage multiplexers 107 is provided with a set of data lines for connection with subscriber telephone lines, and is also provided with a set of data, address and control lines, as shown in FIG. 2, for connection with the second stage multiplexer 108. Each of the first-stage multiplexers 107 includes a set of multiplexer elements as shown in FIG. 5, these elements being connected to the same data, address and control lines set forth in FIG. 2. With respect to the multiplexer elements of FIG. 5, each of these elements has the same construction, the details of the construction being shown in FIG. 6.

Figure 3:
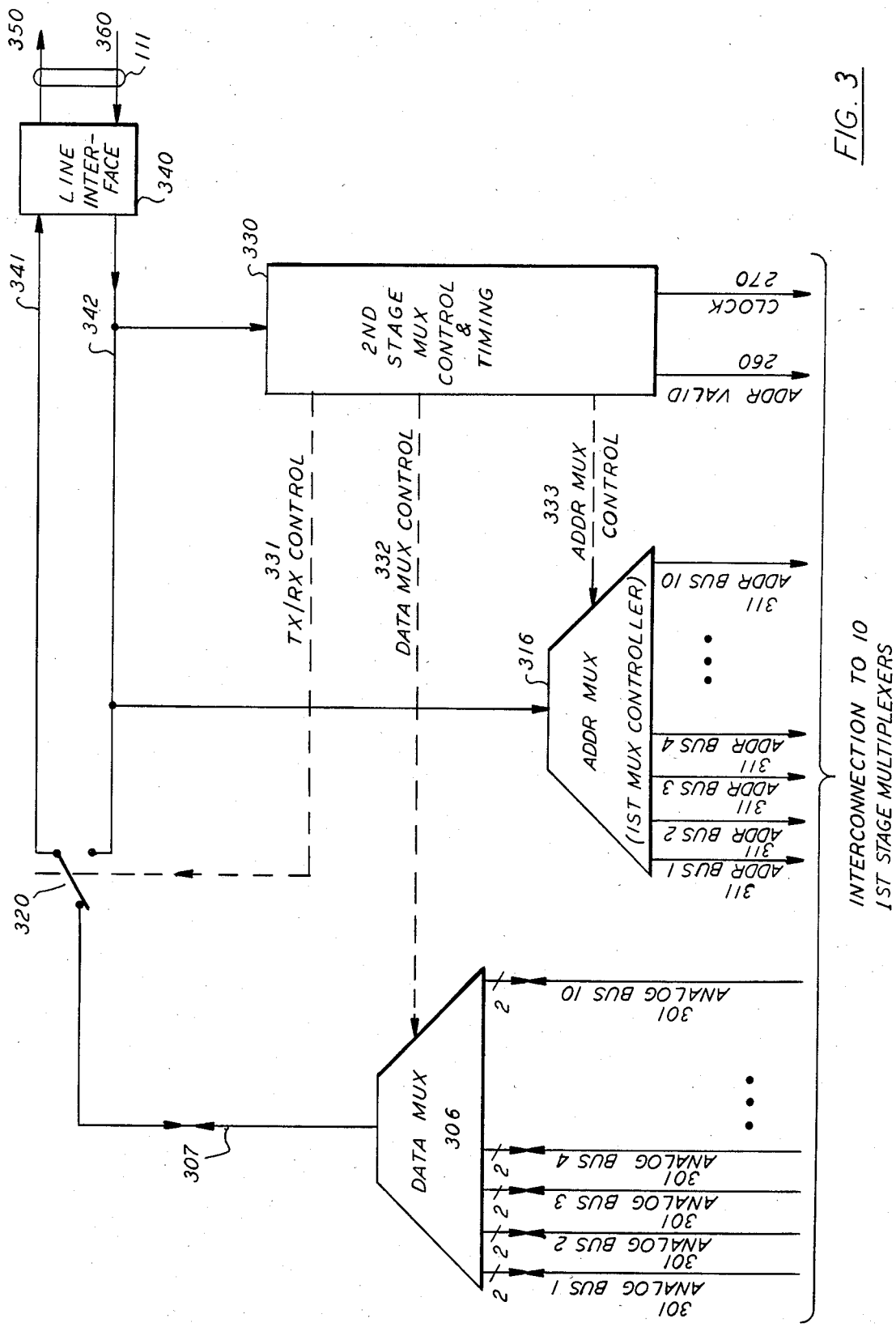
FIG. 3 is a simplified block diagram of a second stage multiplexer of FIG. 1.
Figure 7:
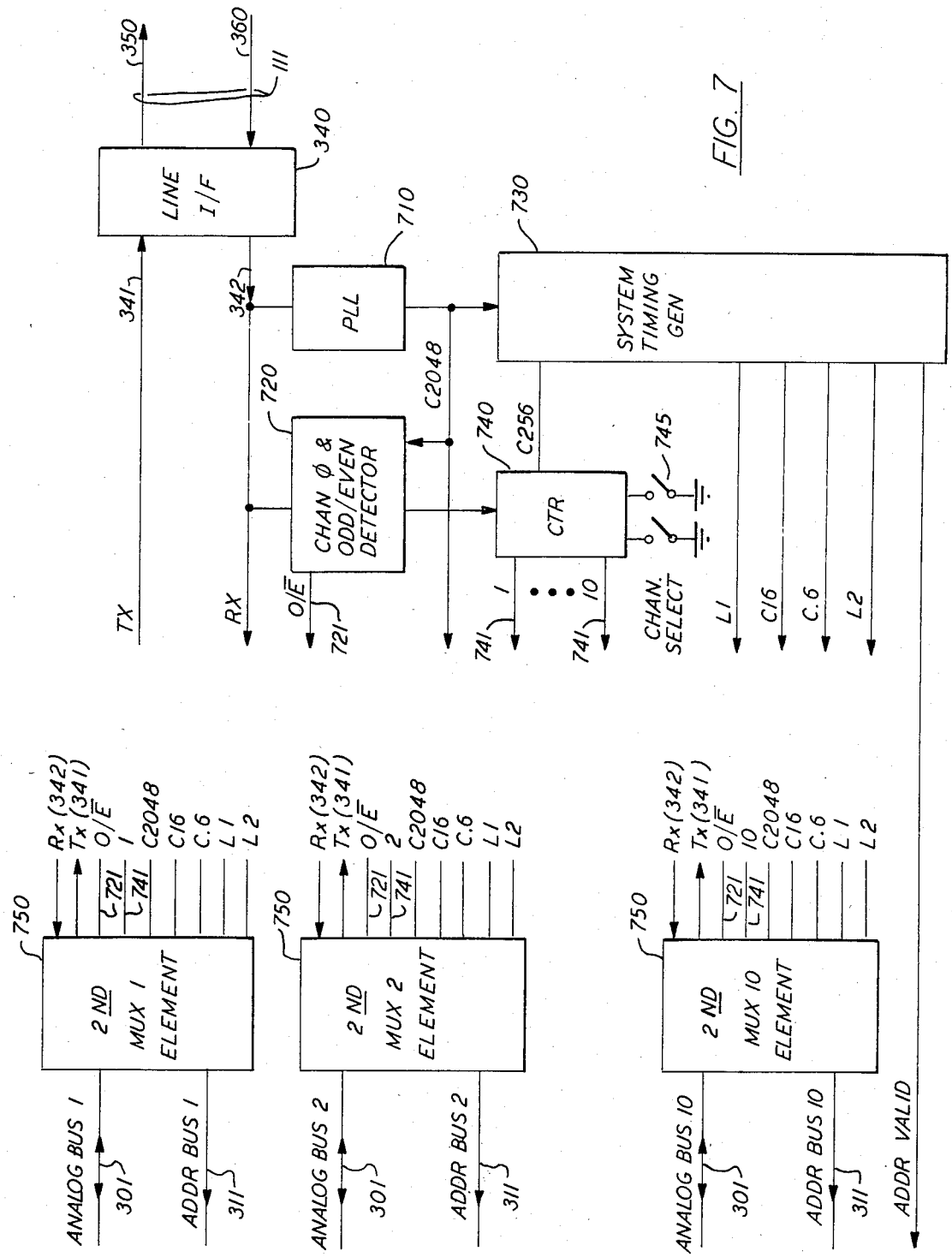
FIG. 7 is a block diagram showing a set of multiplexer elements and other components of the second-stage multiplexer of FIGS. 1 and 3.

As shown in FIG. 3, the second-stage multiplexer 108 is shown functionally as providing for the multiplexing of the data and address lines associated with the first-stage multiplexers 107. The mode by which the second-stage multiplexing of data and address lines is accomplished by the second-stage multiplexer is set forth in FIG. 7 which shows a set of multiplexing elements each of which is associated with a specific one of the first stage multiplexers 107. FIG. 7 also shows control circuitry utilized in the operation of the set of multiplexer elements. Each of the second-stage multiplexer elements have the same construction, details of one such second-stage multiplexer element being shown in FIG. 8.

Figure 4:
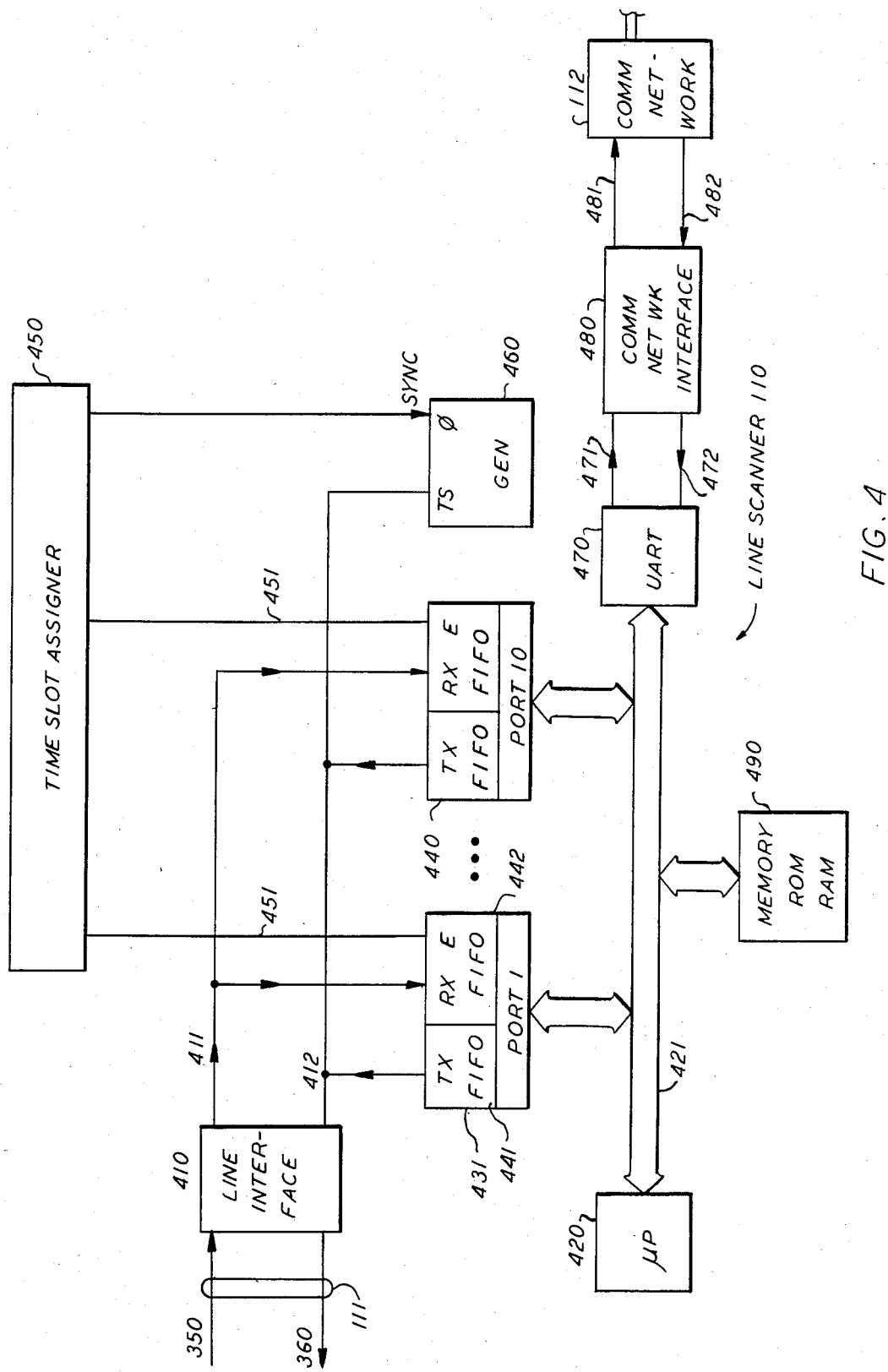
FIG. 4 is a block diagram of a line scanner of FIG. 1.
Figure 5:
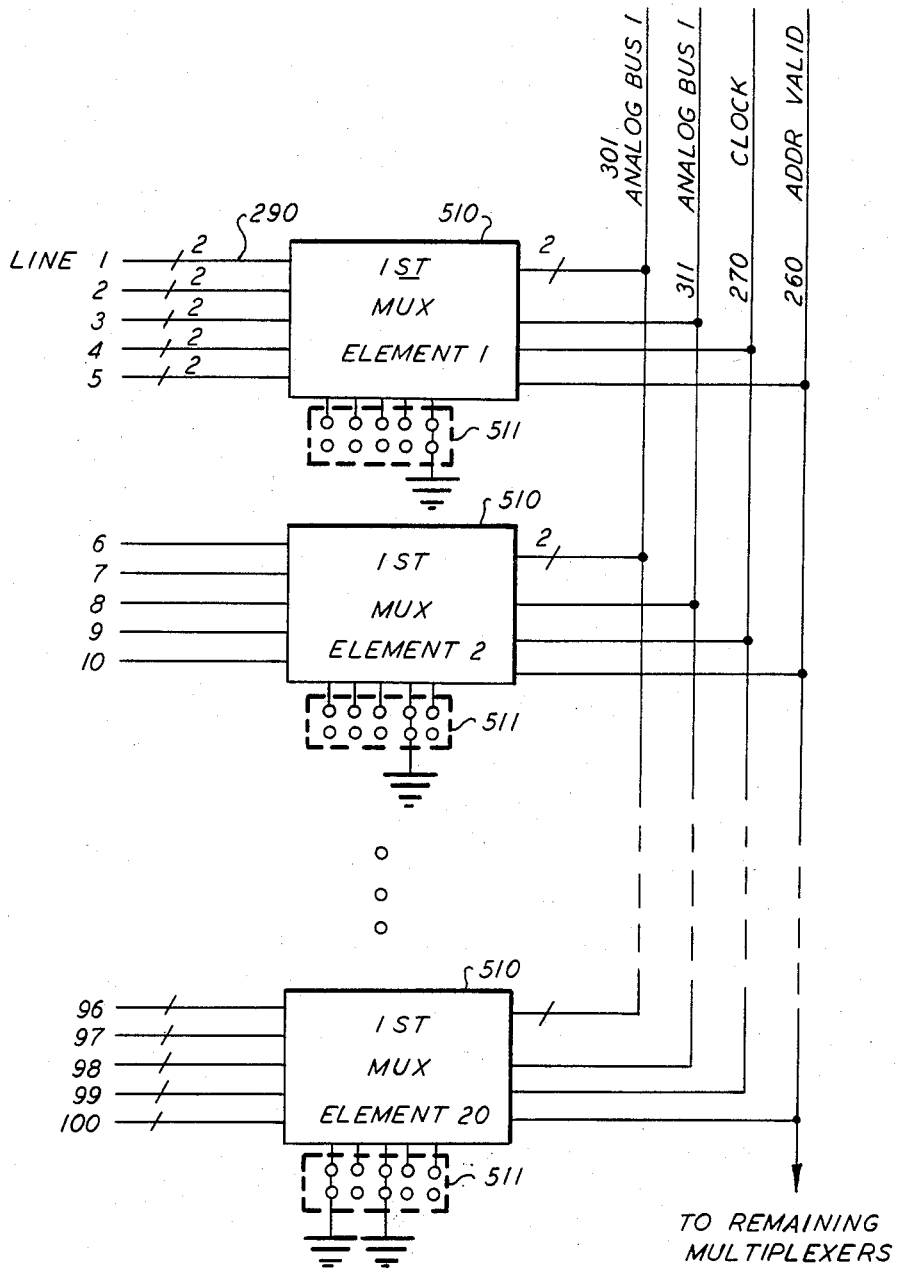
FIG. 5 is a block diagram showing a set of elements of the first stage multiplexer.

The line scanner 110, as depicted in FIG. 4, includes interfacing circuitry and data-transfer ports in conjunction with a microprocessor for control of the data flow via the multiplexing equipment of the multiplexers 107-108. The operation of the data flow under control of the scanner 110 is explained further with reference to the timing diagrams of FIGS. 9 and 11 and with reference to the format of digital words set forth in FIG. 10.

The operation of the system of FIG. 1 will now be reviewed followed by a more detailed description of the components of the system with reference to the FIGS. 2–11.

With reference again to FIG. 1, the operation of the system of the invention permits a remote host computer 109 to transmit a message to the line scanner 110 over the communication network 112. Such a message instructs the scanner 110 on the procedure to be followed for obtaining information from the subscriber premise equipment 100 by use of a first-stage multiplexer 107 and the second-stage multiplexer 108. Information transferred from the scanner 110 toward the telephone line 113 is divided into two parts; one part being an address which instructs the first-stage multiplexer 107 and the second-stage multiplexer 108 as to which one of 1000 telephone lines 113 is to be selected. The second part of the information from the scanner 110 is the actual message to be sent to the subscriber premise equipment through the second-stage multiplexer 108, the first-stage multiplexer 107 and, finally, to the subscriber premise equipment 100. The message from the scanner 110 to the subscriber premise equipment 100 causes the equipment 100 to respond in a specified manner such as to a command "read the electric meter", "read the gas meter" or "read the water meter". The subscriber equipment 100 then transmits a message back over the same path, namely the telephone line 113, the first-stage multiplexer 107 and the second-stage multiplexer 108 to the scanner 110. The scanner 110 then collects the information from the equipment 100, verifies the data integrity of the information via parity or other means and, upon collection of a complete message, then requests a further message to be sent to the host computer 109 via the communication network 112.

With reference to FIG. 2, the first-stage multiplexer 107 includes ten first-stage multiplexers 107 which connect with the second-stage multiplexer 108. Each of the first-stage multiplexer elements 107 can multiplexer 100 telephone line pairs 290 to a single telephone line bus 280 by which communication is had with the second stage multiplexer 108. Each of the ten first-stage multiplexer elements 210 can multiplex a group of 100 telephone lines to a single analog bus 301, included within the bus 280 as will be described subsequently. Each of the busses 280 are numbered 1–10 to correspond with the numbering of the corresponding individual multiplexer elements 210.

With reference also to FIG. 3, there is shown a simplified representation of the second-stage multiplexer 108 wherein two multiplexers 306 and 316 which operate, respectively, with analog busses 301 and address busses 311 each of which form a part of the bus 280 shown in FIG. 2. Each analog bus 301 includes two lines corresponding to the two lines of a subscriber telephone line pair 290 (FIG. 2). Each address bus 311 provides a signal utilized in the operation of a first-stage multiplexer 107 as will be described. Each of the analog busses 301 provide for two-way communication. Also included within the second-stage multiplexer 108 is a switch 320, a controller 330 and a line interface unit 340. The multiplexer 306 is coupled via line 307 and the switch 320 to the line interface unit 340 by which communication is made to line 111 (FIGS. 1 and 3). The interface unit 340 is coupled via lines 341–342 to terminals of the switch 320. The line 111 includes two lines 350 and 360 of which the line 350 is for outgoing signals and the line 360 is for incoming signals. Similarly, the lines 341–342 are used for outgoing and incoming signal, respectively, which signals are coupled via the interface unit 340 to the line 111. The controller 330 is shown coupled via dashed line 331 to the switch 320 for operation of the switch 320 in both transmitting and receiving modes. The multiplexer 316 is coupled only to the line 342 for receipt of address signals from the line scanner 110. The controller 330 also controls operation of the multiplexer 306 and the multiplexer 316 as indicated by the dashed lines 332 and 333. The controller 330 also provides control signals on lines 260 and 270 for the multiplexer elements 210 of FIG. 2. The control signal on line 260 is an address valid signal; a clock signal is provided on line 270.

The second stage multiplexer 108 provides the function in the system of FIG. 1 of decoding control information and address information from the line scanner 110 and passing the information onto a selected one of the first-stage multiplexer elements 210. The multiplexer 108 also provides the function of multiplexing the data from each of the analog busses 301 to the transmit and receive busses 341–342 via the transmit/receive switch 320. The controller 330 provides timing and control information for each of the elements 210 of the first-stage multiplexer 107 as well as for the components of the second-stage multiplexer 108.

With reference also to FIG. 4, the line scanner 110 includes an interface unit 410 which connects via the bus 111 to the interface units 340 (FIG. 3) of the second-stage multiplexer 108. The line 350 connects via the interface unit 410 to a line 411 and the line 360 connects via the interface unit 410 to a line 412. Also included within the scanner 110 is a microprocessor 420 connected to a bus 421. Ten data transfer ports 431–440 connect between the lines 411–412 and the bus 421. Also included within the scanner 110 is a time/slot assigner 450 connected by lines 451 to each of the ports 431–440. The bus 421 also connects with a UART 470 (universal asynchronous receiver transmitter), a memory 490 including both read-only and random-access sections, and a network interface unit 480 coupled via busses 471 and 472 to the UART 470. The busses 471–472 connect via the unit 480 to the communication network 112 (FIG. 1) via busses 481–482.

In operation, the scanner 110 receives messages from a host computer 109 via the communication network 112. This message from the host computer 109 is interpreted by the microprocessor 420 to be either a command or a request for information from the subscriber premises equipment 100 (FIG. 1). The microprocessor 420 coordinates the data requested from a subscriber equipment 100 with the requisite one of the telephone lines 113 connecting with the equipment 100, so as to select the requisite switch connections in the first-stage multiplexer 107 and in the second-stage multiplexer 108.

Messages received from the communication network 112 are routed through the network interface unit 480 and via the UART 470 and bus 421 to the microprocessor. Path selection for the communication of data between the line scanner and subscriber equipment 100, as well as message formatting and information routing are processed by the microprocessor 420 utilizing algorithms stored in the memory 490. After the microprocessor 420 has determined which message is to be transmitted, and via which communication path the message is to be sent, the microprocessor 420 then outputs the message to one of the ten data-transfer ports 431–440 as determined by equipment information stored in the memory 490. the message is inserted into the line 412 (a data carrying bus) by the designated one of the ports 431–440. This information is then passed to the second-stage multiplexer 108 via the interface unit 410 and the communication link represented by line 360. As used herein the phrase "communication link" includes any means for transferring information between any two points according to conventional telecommunicator standards, such as, for example, fiber optics, microwave networks, voice grade telephone channels, or the like.

Information from the second-stage multiplexer 108 is inputted to the microprocessor 420 from the communication link of line 350 through the interface unit 410 to the ten ports 431–440, the information then travelling over the bus 421 to the microprocessor 420. Timing of information transfer from each of the ports 431–440 to the transmit line 412 and from the receive line 411 is controlled by the time slot assigner 450. Each of the ports 431–440 includes a pair of registers 441–442 for transmission and reception, respectively, each of the registers 441–442 operating in the manner of first-in, first-out (FIFO). The timeslot assigner 450 enables transmission from each of the transmit and receive registers 441–442. Timeslot 0 on the communication paths on lines 350, 360, 411 and 412 contain information to allow synchronization of data flow along these communication paths by the second-stage multiplexer controller 330. Also included within the scanner 110 is a generator 460 which generates timing signals for line 412 in response to a synchronous signal from the timeslot assigner 450. The timeslot assigner 450 enables the generator 460 to insert the synchronization signal at the proper time onto the line 412, the timing signal designating timeslot 0.

Referring also to FIG. 5, there is shown a more detailed view of one of the ten multiplexers 107 disclosed in FIGS. 1 and 2. Each of the ten multiplexers 107 is further subdivided into 20 multiplexing elements 510 as depicted in FIG. 5. Each multiplexing element 510 is capable of multiplexing up to five telephone lines, wherein each of the telephone lines is one of the lines 290 of FIG. 2. The two-wire pair of each telephone line 290 fans into one two-wire analog data bus 301 under instructions from a single-line address bus 311.

Each of the multiplexing elements 510 is of the same construction, and feed into the same busses 301 and 311, as well as the signal lines 270 and 260. These lines are also shown in FIGS. 2 and 3. Each of the multiplexing elements 510 is provided wth a unique identification implemented by means of a set of switches, of which three exemplary switch sets 511 are shown in FIG. 5. The unique identification allows the multiplexing elements 510 to be responsive to an address on the address bus 311, which address is provided by the second-stage multiplexer 108 to select the desired telephone line 290 from the multiplexer 107 to the main distribution frame 103 (FIG. 1) and then continuing along the line 113 to the subscriber premises.

Figure 6:
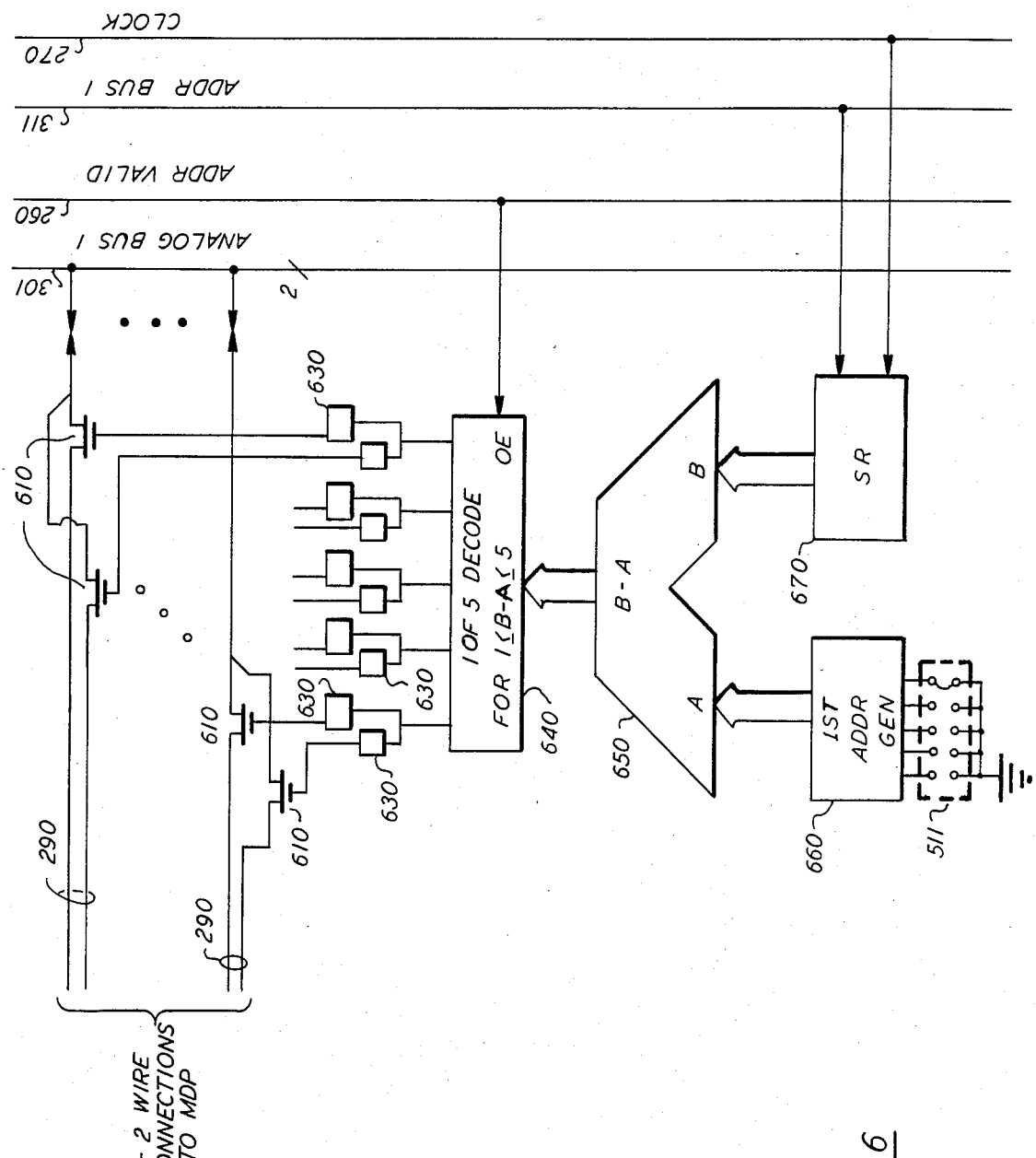
FIG. 6 is a detailed block diagram of a first-stage multiplexer element of FIG. 5.

FIG. 6 shows details of a multiplexer element 510 of FIG. 5. In a multiplexing element 510, a subscriber line pair 290 is coupled by a pair of analog switches 610 to the bus 301. Each pair of switches 610 is driven by a pair of drivers as is described in the U.S. Pat. No. 4,170,740 issued to Pernyeszi on Oct. 9, 1979 and assigned to the assignee hereof. The switches 610 provides for the analog coupling of telephone signals on a line pair 290 under control of a digital signal applied to a pair of drivers 630.

The multiplexing elements 510 further includes a decoder 640, an arithmetic logic unit (ALU) 650, an address generator 660 and a shift register 670. Also shown in FIG. 6, is the switch set 511 previously shown in FIG. 5. The decoder 640 receives the address valid signal from line 260, and also receives the output of unit 650. The shift register 670 is coupled to the address bus 311 and also to clock signals on line 270.

In operation, interconnection between the second-stage multiplexer 108 and each of the multiplexing elements 510 of the multiplexer 107 is provided by the analog bus 301, address bus 311, the address valid signal on line 260 and the clock signal on line 270. With respect to the first of the ten first-stage multiplexers 107, FIG. 2 shows the first of the busses 280 bringing in the busses 301 and 311 to the first of the multiplexers 107. In that first multiplexer 107, the busses 301 and 311 are routed to each of the 20 multiplexing elements 510. In any one of the multiplexing elements 510, the bus 311 is routed to the shift register 670 for storing data therein in response to clock signals on line 270. Chip select information is determined by the switch set 511 to the first address generator 660 in the first out of the 20 multiplexing elements 510. This address generator 660 determines the first of the five addresses to be accepted from the address bus 311. In each of the 20 multiplexing elements 510 of a multiplexer 107, the switch sets, such as the switch sets 511, are set to different numbers so as to identify the specific one of the multiplexing elements 510. Thus, in the first of the multiplexing elements 510, the switch set is preset to a 1; and in the second of the multiplexing elements 510, the switch set is preset to a 2.

The output of the first address generator 660, (this being the generator of the first of the multiplexing elements 510) indicates a 6. The address generator 660, in general, performs the algorithm $N \times 5$ minus 4 wherein N is the value of the jumpers of switches in the switch set 511.

The output of the first address generator 660 is subtracted from the output of the shift register 670 in the arithmetic unit 650, and is outputted to the decoder 640. The decoder 640 is a 1 of 5 type of decoder and, accordingly, in response to the signal from the unit 650, activates a pair of the drivers 630 which, in turn, activate the corresponding pair of switches 310. The output of the decoder 640 is valid only if the value of the output of unit 650 is greater than 0 or less than 6. The output of the decoder 640 changes state only when the address valid line 260 goes true. The address valid line goes true after the shift register 670 has been loaded with the information from the address bus 311.

If one pair of the switches 110 is instructed to be turned on, then all other ones of the pairs of switches 610 of the group of one hundred telephone line pairs 290 would be instructed to be turned off. Information from the first of the telephone lines 290 will then be connected through the pair of switches 610 to the analog bus 301 whereby information can be transferred from the line scanner 110 through the second stage multiplexer 108, and onto the subscriber premise equipment 100 over the telephone line 113. Or, alternatively, information can flow in the reverse direction from the subscriber premise equipment 100 to the line scanner 110 through the same set of channels in the multiplexing equipment.

Figure 8:
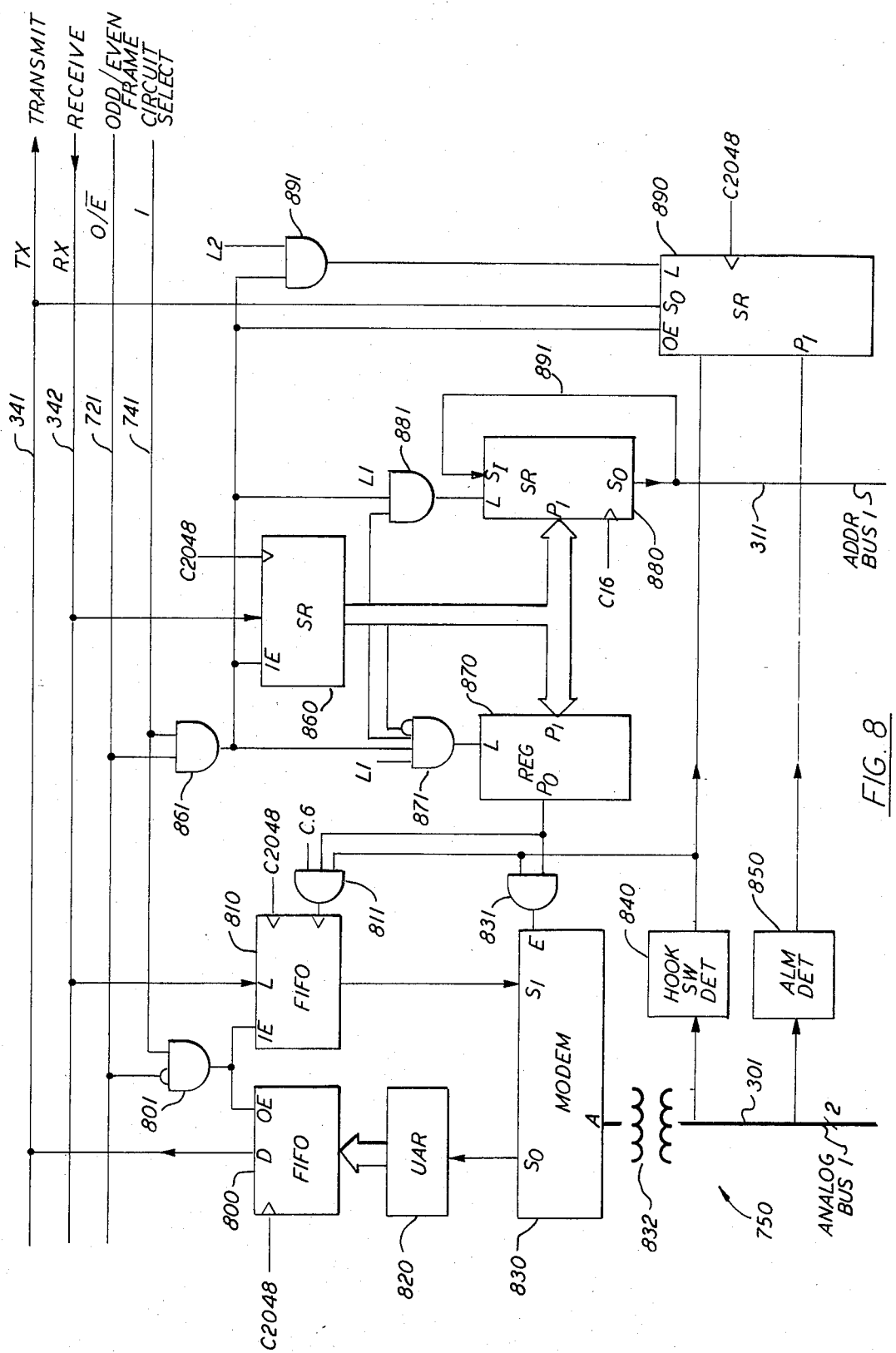
FIG. 8 is a detailed block diagram of a second-stage multiplexer element of FIG. 7.

With reference now to FIGS. 7 and 8, there is shown a more detailed view of the second-stage multiplexer 108, previously described with reference to FIG. 3. As has been noted above, the diagram of FIG. 3 is a simplified representation of the function of the second-stage multiplexer 108. The actual components utilized in providing the multiplexer functions are shown in FIG. 7, with a further description of multiplexer elements therein being provided by FIG. 8.

The second-stage multiplexer 108 comprises the interface unit 340 (previously shown in FIG. 3), a phase-locked loop 710, a detector 720 of the first channel (channel 0) in a sequence of groups of data arriving along bus 342 from the interface unit 340, a system timing signal generator 730, a channel counter 740, and a set of ten second-stage multiplexer elements 750.

The phase-locked loop 710 is responsive to timing pulses appearing in a received signal on bus 342 for providing an output clock signal, identified at C2048 in the drawing, which is synchronized to the data flow on bus 342. The output clock signal from the loop 710 drives the genertor 730 to provide a set of timing signals synchronized with the data flow on the bus 342. The timing signal outputted by the loop 710 is also applied to the detector 720 to synchronize the operation of the detector with the data flow on the bus 342. Thereby, the detector 720 is able to detect the presence of a specific frame or group of instruction words which allow identification of the subsequent frames of data which are to follow along the bus 342. The detector 720 outputs an odd/even signal on line 721 to each of the multiplexer elements 750 for the designation of odd and even frames of data. One of the output timing signals of the generator 730 is a sequence of clock pulses identified at C256 in the drawing, which is applied to the counter 740. The counter 740 is reset by signal from the detector 720, and then begins to count the clock pulses from the generator 730. The counter 740 is in the form of a ring counter having a set of ten output lines 741, individual ones of the output lines 741 containing logic values of 1 sequentially in accordance with the count of the counter 740. The lines 741 are connected to respective ones of the multiplexer elements 750 with the first one of the lines 741 going to the first one of the elements 750 and the tenth of the lines 741 going to the tenth one of the multiplexer elements 750. Thereby, the counter 740 sequentially activates individual ones of the multiplexer element 750.

Each of the multiplexer elements 750 is shown with a set of control and timing lines on the right hand side of each block representing the multiplexer element 750. Also shown on the right hand side of the block are the receive and transmit busses 342 and 341 which connect from the interface unit 340 to each of the multiplexer elements 750. On the left hand side of each block representing a multiplexer element 750, there are shown connections of the busses 301 and 311 shown previously in FIGS. 2, 3, and 5. With respect to the ten analog busses 301, the first of these busses connects with the first of the multiplexer elements 750, the second of these busses connects with the second of the multiplexer elements with successive ones of the busses being connected to respective ones of the multiplexer elements 750. Similarly, each of the address busses 311 is connected to a corresponding one of the multiplexer elements 750, the first of the busses 311 being connected to the first of the multiplexer elements 750 and the tenth one of the address busses 311 being connected to the tenth one of the multiplexer elements 150. With respect to the timing signals applied to the right hand side of each block representing a multiplexer element 750, the four timing signals identified as L1, C16, C6, and L2 are applied by the generator 730 to each of the multiplexer elements 750. Also, the output clock signal of the phase-locked loop 710 is also applied to each of the multiplexer elements 750.

Also shown in FIG. 7 is the address valid signal which is generated by the generator 730. Channel selection switches 745 connect with the counter 740 for grounding specific terminals thereof, thereby to select a specific group of output lines 741 which can be activated by the counter 740.

In FIG. 8, there is shown a detailed view of the first ones of the multiplexer elements 750 of FIG. 7. All of the multiplexer elements 750 have the same construction and, accordingly, the description presented in FIG. 8 applies to all of the multiplexer elements 750. FIG. 8 shows the interconnection of the multiplexer element 750 with the transmit and receive busses 341 and 342, and also with the lines 721 and 741 carrying control signals. Also shown are the aforementioned clock and timing signals of the generator 730. The analog bus 301 and the address bus 311 are shown at the bottom of FIG. 8.

The multiplexing element 750 includes a register 800 with an AND gate 801 coupled to an input terminal thereof, a register 810 with an AND gate 811 coupled to an input terminal thereof, the UAR (universal asynchronous receiver) 820, a modem 830 with an AND gate 831 coupled to an input terminal thereof and with a transformer coupling 832 for connection with the bus 301, a hook switch detector 840, an alarm detector 850, a shift register 860 providing a serial to parallel conversion, an AND gate 861 coupled to an input terminal of the register 860, a register 870 providing parallel conversion, an AND gate 871 connected to an input terminal of the register 870, a shift register 880 providing parallel to serial conversion, an AND gate 881 coupled to an input terminal of the register 880, and a shift register 890 with an AND gate 891 coupled to an input terminal thereof. The shift register 860 is coupled to the receive bus 342 and is activated by signals from the gate 861, the latter having input terminals connected to the control lines 721 and 741. The output terminal of the gate 861 also connects with input terminals of the gate 871, 881 and 891. Digital signals from the receive bus 342 are inputted serially to the register 860 and are outputted in parallel format from the register 860 to each of the registers 870 and 880. Specific ones of the output lines of the register 860 in combination with the output signal of the gate 861 and the timing signal L1 are applied to the gate 871 for activating the register 870. A signal from one of the output lines of the register 860 in combination with the output signal of the gate 861 and the timing signal L1 are applied to input terminals of the gate 881 for activating the register 880. A feedback path 892 couples signals from an output terminal of the register 880 to an input terminal thereof to permit recirculation of a series of digital symbols to permit retransmission of an address along bus 311, if desired. The output terminal of the gate 861 is also applied to an input terminal of the register 890, the output signal of the gate 861 in combination with the timing signal L2 being applied to input terminals of the gate 891 for activation of the register 890.

The gate 801 has two input terminals, one of which is complemented, the complemented input terminal being connected to the control lines 721 and the other input terminal being connected to the control lines 741. The output terminal of the gate 801 connects with input terminals of both of the registers 800 and 810. The register 810 receives an input signal from the receive bus 342, and the register 800 outputs a signal to the transmit bus 341. Each of the registers 800, 810, 860 and 890 receive the clock signal from the output terminal of the phase-locked loop 710 (FIG. 7). The hook switch detector 840 and the alarm detector 850 are both coupled to the analog bus 301 to provide detection signals which are outputted to the register 890. In addition, the detection signal of the detector 840 is also outputted to input terminals of the gates 811 and 831. The gate 831 strobes the modem 830 in response to the presence of the output signal of the detector 840 and an output signal of the register 870 at the input terminals of the gate 831. The application of the output signal of the detector 840 to the gate 811 in combination with the aforementioned output signal of the register 870 and the timing signal C6 to input terminals of the gate 811 results in a strobing of the register 810 by the gate 811. The UAR couples subscriber telephone signals from the modem 830 to the register 880. Both of the registers 800 and 810 operate in accordance with the operating mode of first-in, first-out (FIFO) for transmission of data between the modem 830 and the transmit and receive busses 341 and 342.

Figure 9:
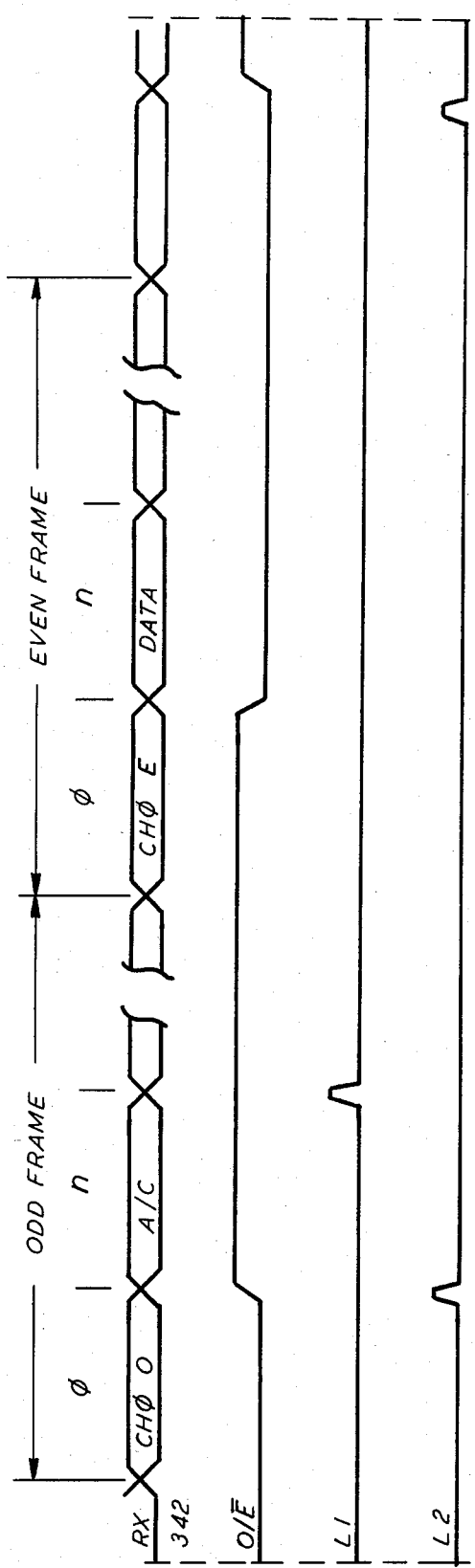
FIG. 9 is a timing diagram useful in explanation of the operation of the line scanner of FIG. 4.
Figure 10:
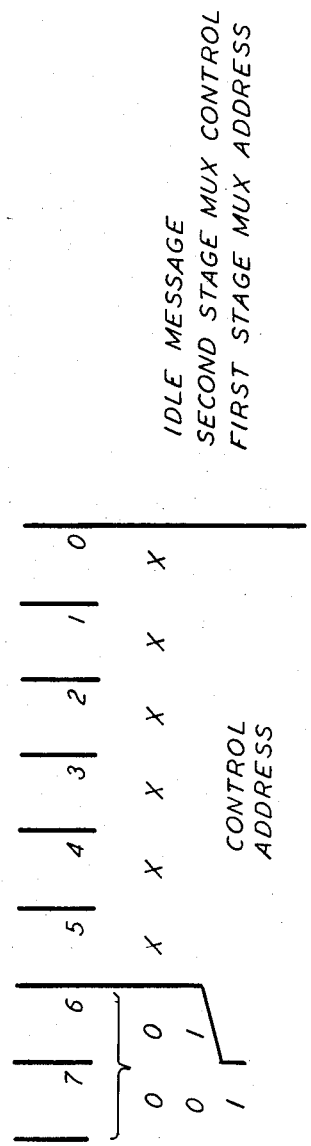
FIG. 10 shows the format of address/control digital words used in the operation of the multiplexing equipment of FIG. 1.

In operation, and with reference also to FIGS. 9–11, information from the line scanner 110 (FIGS. 1 & 4) passes through the line interface 340 (FIGS. 3 & 7) via the transmit bus 350 and the receive bus 360. Information received from the line scanner 110 is distributed through the second-stage multiplexer 108 on receive bus 342. Clock is extracted from the data stream with the phase-locked loop 710. The clock information is then passed on to control the rest of the system through the system timing generator 730. Channel 0 information is detected in the detector 720 and the determination of an odd frame or even frame is attained.

The odd/even frame information is utilized to determine whether information on the receive buss 342 is to be interpreted as address information or multiplex switch control, or as data which is to be passed on by the modem 830 to the subscriber premise equipement 100. Channel 0 information is also used to synchronize the system to enable the timeslot position to be utilized in the routing of the information from the line scanner 110 to the appropriate multiplexer element 150. For example, timeslot #1 contains information for the first one of the second-stage multiplexer elements 750. Timeslot #2 contains information for the second one of the second-stage multiplexer elements 750, with subsequent ones of the timeslots being applied to corresponding ones of the multiplexer elements 750. The timeslot information is decoded by use of the clock information from the system timing generator 730 and the channel 0 detector 720 for synchronization of the various components of the system.

Received information is routed from the line interface unit 340 for carrying out the functions of the data multiplexer 306 and the address multiplexer 316. The function of the address multiplexer 316 is attained by operation of the serial-to-parallel shift register 860, the parallel-to-serial shift register 880 for data transmission to the first stage multiplexer 107, and the parallel-to-parallel 870 which provides control information within the second-stage multiplexer 108 itself.

During an odd frame as determined by the detector 720, serial information is allowed by pass from the receive bus 342 into the shift register 860. This is accomplished by energizing the input enable line on shift register 860 by the output signal of the AND gate 861. Inputs of the AND gates 861 are the aforementioned first one of the circuit select lines 741 and the odd/even frame signal on line 721. After the entire message has been transferred from the receive bus 342 into the shift register 860, a determination will be made as to whether this information is address information or control information. In the case of control information, the most significant bit in the shift register 86 will be true. This bit, along with the enable signal, as outputted from the AND gate 861, allows the load pulse L1 to activate the transfer of information into the parallel-in, serial-out register 880. The register 880 contains the address information which is to be passed onto the first-stage multiplexer 107.

In the case wherein bit 7 in the shift register 860 is false and bit 6 is true, then the information contained in the shift register 860 is to be interpreted as a local control message. The local control message is then strobed into the register 870 with the output of AND gate 871 under control of the load pulse L1. If both bits 6 and 7 are false, then the message stored in the register 860 will be ignored because the message is an idle message. Address information from the register 880 is then shifted out on the first one of the address busses 311 to the first-stage multiplexer 107 wherein one of the switches 610 (FIG. 6) connects one of the tip-ring pairs 290 to the first one of the analog busses 301. Information available on the analog bus 301 at this time is the status of the subscriber telephone switch and the presence or absence of an alarm condition from the remote premise equipment 100.

Outputs of both the hook-switch detector 840 and the alarm detector 850 are loaded into the shift register 890. The output of the hook-switch detector 840 is further routed to the enable terminal of the modem 830 via the gate 831, and is also routed to the clock enable input terminal on the receive register 810. If the hook-switch detector 840 senses an off-hook condition at the subscriber premise, the provision of the signal at the enable terminal on the modem 830 prevents the modem from transmitting a carry signal, and thereby avoiding the presence of information or noise on the subscriber telephone line 113. Also, the register 810 is inhibited from transmitting information to the modem 830.

Information stored in the shift register 890 is transmitted to the line scanner 110 via the transmit bus 341. Upon a determination by the scanner 110 that both the hook switch and the alarm bits are proper for data transmission in the next odd frame, the scanner 100 sends a control message to the second-stage multiplexer 108, which control message is loaded into the register 870 as described herein above. The foregoing control word transferred into the register 170 enables both the modem 830 and the register 810 to operate, by transmitting the required message to the subscriber premise equipment 100.

Information stored in the register 810 is shifted out to the modem 830 where it is placed on the analog bus 301 in the form of a modulated carrier signal; the modulation employed is a frequency shift key (FSK) modulation. The modulation is routed along the analog bus 301 through a pair of switches 610 in the first-stage multiplexer 107 to the selected telephone line pair 290. The information then proceeds via the telephone line 113 to initiate action in the premise equipment 100.

Information provided by the subscriber premise equipment 100 is also in the form of frequency shift key modulation. The information is routed from the equipment 100 via the telephone line 113 and onto the first-stage multiplexer 107 where it passes through a designated pair of switches 610. The information exits the first-stage multiplexer 107 by the analog bus 301 and proceeds to the receive section of the modem 830 in the second-stage multiplexer 108. In the modem, the information is converted to a digital data stream which is outputted to the UAR (universal asynchronous receiver) 820. Each eight bits of information from the modem 830 are collected in the UAR 820 and are transferred to the register wherein the eight bits are collected. Information from the register 800 is transferred to the scanner 110 in successive even frames via the transmit bus 341.

FIG. 9 shows the timing of information at the second-stage multiplexer 108 on the side of the multiplexer coupled to the scanner 110. Information on the receive bus 342 is shown diagrammatically as a timeslot assignment PCM (pulse code modulation) system including odd and even frames of X timeslot in each frame. During the odd frame, channel 0 information contains a unique code indicating not only the position of timeslot 0, but also the beginning of an odd frame. Similarly, during an even frame, channel 0 information contains a unique code indicating timeslot 0 and even frame. This information is recognized in the second-stage multiplexer detector 720 which outputs a signal to inform the signal as to whether an odd or even frame is being received.

At the beginning of timeslot N, a load pulse L2 is generated by the generator 730. The L2 pulse causes information from the hook-switch detector 840 and the alarm detector 850 to be loaded into the shift register 890. The timing generator 730 provides a load pulse L1 at the end of the Nth timeslot, which results in the loading of information into the shift register 880 or control register 870, depending on the contents of the output signal of the shift register 860. The load pulses occur on each timeslot to cause loading into their appropriate registers as selected by circuit select signal on line 741 from the channel counter 740.

FIG. 10 shows the format of the information contained in the address control word of an odd frame. If bits 6 and 7 of the word are both 0, the message is assumed to be an idle message and bits 0-5 are ignored. If bits 6 and 7 of the control word are 1 and 0 respectively, then bits 0-5 of that word are assumed to be a control message to be interpreted by the second-stage multiplexer 108. If bit 7 is a 1, then bits 0-6 contain the address of the first one of the one hundred pairs of switches 610 in the first-stage multiplexer 107 to be selected. This information is passed onto the first-stage multiplexer 107 via the first one of the address busses 311.

FIG. 11 is a timing diagram of signal flow at the interface between the first and the second-stage multiplexer 107-108. In the timing diagram, the legends A, B, C, D, E, F and G identify various activities that are taking place. "A" represents the hook-switch detector time, which time is less than 100 milliseconds typically. "B" represents the transmission and the scanner response times to the detection of an on-hook condition. "C" represents a transmit message to the subscriber premise equipment. "D" represents the response time of the subscriber premise equipment 100. "E" represents the received message from the subscriber premise equipment. "F" represents the time required by the scanner 110 to sample a received message. "G" represents one transaction time which occupies 500 milliseconds if all 100 lines of the first-stage multiplexer are to be serviced within an interval of one minute. Time of greater than the 510 milliseconds are allowed if one of the following conditions is true: (1) one minute scanning rate is not required; (2) not all lines require scanning and the scanner 110 is capable of skipping the scanning of unused lines; and (3) not all messages are the same length, and the scanner 110 is capable of adaptive reaction times.

With reference also to FIG. 11, information is shifted out of the second-stage multiplexer 108 at the register 880 via the first one of the address busses 311 at the time starting T₀. Information is shown in the first trace of the timing diagram as being an address. At a data rate of 16 kilobits per second, a time interval of approximately 500 microseconds is required to shift the address out of the register 880 to the first-stage multiplexer 107. At the end of the address transmission, the address valid line is activated by the generator 730 in the second-stage multiplexer 108. At this point in the operation, the system will remain idle to allow time for the hook-switch detector 840 to ascertain whether the subscriber telephone is on-hook or off-hook. The hook-switch status information is transferred to the scanner 110 by the shift register 890 and the transmit bus 341. After an interval of approximately 100 milliseconds, the scanner 110 ascertains whether the hook switch at the subscriber premise is on-hook or off-hook. If the telephone line 113 to the selected subscriber is idle, the scanner 110 instructs the modem 830 and the register 810 to transmit the message contained in the register 810 to the subscriber premise. During the time period E, information from the subscriber premise equipment is received and stored in the receive register 800. The components of the first and the second stage multiplexers 107-108 is completely controlled by messages from the scanner 110 and, accordingly, the length of time required to listen and to transmit via the subscriber line pair 290 is totally under control of the scanner 110. Typically, the line connection time will be approximately 500 milliseconds, as is shown in FIG. 11.

The foregoing system is advantageously utilized for applications such as the reading of remote transducers such as, by way of example, the transducers of meters for gas, water and electricity, and also pay-per-view television encoders, factory sensors (temperature, pressure, humidity, etc.) and other types of transducers located remotely from the central office telephone equipment.

The system is also utilized for remote control by providing two-way communication from the communication network 112 (FIG. 1) to the subscriber premise equipment 100. Because the communication is bi-directional, it is possible for a host computer 109 to communicate or send messages to the subscriber premise equipment 100 to initiate activity such as the turning off of main feeding elements in hot water heaters to provide the electric companies a mechanism for load shedding during peak power delivery times.

The system is useful for alarm reporting. Although similar in nature to the reading of a remote transducer, the operation in the alarm reporting function makes possible the connection of devices which will report fire, intrusion, flooding or even equipment failure at a remote location. In the transmission of an alarm, the system meets the need of urgency by which this message must be transferred through the system to the servicing agency.

The secondary connection by the system to each of the telephone lines in the central office equipment provide the telephone company with the ability to do line-fault sensing. For example, if a message is transmitted from the scanner 110 to the premise equipment 100, and no response is received from the equipment 100 to the scanner 110, then the scanner 110 can signal an indication of the missing message to both a host computer 109 and to the operations and maintenance center of the telephone company for reporting a possible line outage.

The foregoing description of the system of the invention provides for the features of module separation. In view of the type of data communication from the communication network 112 and the scanner 110, as well as the communication mechanism between the scanner 110 and the second-stage multiplexer 108, it is possible to have geographical separation between these system components. The line interface on each of these components, namely, the second-stage multiplexer 108 and the scanner 110, need not be digital devices as they may be modems. The outputs of these modems may be connected to any suitable carrier equipment to allow data transmission over large distances.

A further feature of the invention is appreciated when the system is connected to the central office by use of the adapter or plug referred to above and described in the above-noted pending patent application. The number of cable pairs in the main distribution frame 103 are reduced from approximately 100 pairs at the input of the first-stage multiplexer to one pair at the output of the first-stage multiplexer. Furthermore, the number of pairs of telephone leads at the input of the second-stage multiplexer is reduced from 30 pairs to one pair at the output of the second-stage multiplexer is reduced from ten pairs to one pair at the output of the second-stage multiplexer, thereby giving a total concentration of 1000 to 1.

The inventive system provides control access to data transmission in that message and data entry into the system from the communication network 112 is accomplished via the scanner 110. By using state of the art intelligence circuits in the construction of the scanner 110, it is possible for the scanner to exclude all but certain messages and data types being received at the input port of the scanner from the subscriber lines.

The system is operable with a distributed data base. The primary storage of data is in the host computer 109. At the termination of transmission of this data, the host computer will transmit a message and possibly further data to the scanner wherein the data is temporarily stored. The scanner will then act upon the data to cause the premise equipment 100 to be read and information to be transferred back to the host computer. At this time, all information in the line scanner can safely be erased since data has been stored in the host computer 109. Hence, although the scanner acts upon a message in a manner wherein much data is to be read, the data storage in the scanner is transitory.

The system is modularly expandable. Although it is possible to connect 30 second stage multiplexers to each scanner, it is not a requirement of the system that all 30 second stage multiplexers be employed. Furthermore, there is no requirement as to the number of line scanners connected to the communication network 112.

The bidirectional data transmission capability of the system is provided by the scanner and each of the multiplexers. Thereby, it is possible to send messages in both directions between the communication network 112 and a telephone line 113.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

We claim:

1. An information transport system connecting equipment at the premises of a telephone subscriber with a service provider, said system comprising:

a plurality of first multiplexing means connected at a telephone company central office to subscriber telephone lines, the connection between each of said first multiplexing means and said telephone lines being made at a set of access points on a connector block of a main distribution frame at said central office, each said first multiplexing means including switches to said subscriber telephone lines for selecting a specific one of said subscriber lines, said switches permitting bidirectional communication between said first multiplexing means and said subscriber equipment;

second multplexing means and a line scanner, said second multiplexing means coupling each of said first multiplexing means to said line scanner, said second multiplexing means including a set of multiplexing elements connecting with individual ones of said first multiplexing means, each of said second multiplexing elements having a modem for converting data signals of said subscriber equipment to a carrier modulated signal, each said second multiplexing element further including means, responsive to the hook condition of a telephone connected to a subscriber line, for activating said modem to transmit data between one of said first multiplexing means and said line scanner; and each of said first multiplexing means and said second multiplexing means and said line scanner is of modular construction; said system further comprising communication links between said line scanner and said service provider, between said second multiplexing means and each of said first multiplexing means, and between said second multiplexing means and said line scanner to permit modular expansion of said system, said system being operable with a host computer of said service provider, said host computer storing data for use by said line scanner, and wherein said line scanner can limit access to a subscriber line in accordance with data stored in said host computer.

2. A system according to claim 1 wherein said second multiplexing means further comprises selection means responsive to a command from said line scanner for selecting a specific one of said multiplexing elements to be activated by said activating means.

3. A system according to claim 2 wherein said selection means is coupled between said activating means and a communication link from said line scanner for operating said activating means in accordance with a selection of said selection means.

4. A system according to claim 3 wherein said selection means includes a counter for counting said multiplexing elements.

5. A system according to claim 3 wherein said selection means includes timing circuitry synchronized by a signal transmitted along a communication link between said line scanner and said second multiplexing means, said timing circuitry providing clock signals for the operation of said selection means.

6. A system according to claim 5 wherein a signal on said communication link between said line scanner and said second multiplexing means is modulated onto a carrier and wherein said timing circuitry includes a phase-locked loop for extracting a sychronization signal from the communication link.

7. A system according to claim 3 wherein said activating means includes a serial-to-parallel register for reception of serially formatted address data from one of said communication links and gating means connected to pre-selected output bits from said register for activating said modem.

8. A system according to claim 3 wherein said activating means includes a serial-to-parallel register for reception of serially formatted address data from one of said communication links and means coupled to an output terminal of said register for addressing one of said switches in one of said first-multiplexing means.

9. A system according to claim 8 wherein each of said first-multiplexing means includes means responsive to an address signal of said addressing means for driving a pair of said switches coupled to ring and tip wires of a subscriber line.

* * * * *